United States Patent
Piepel et al.

(10) Patent No.: US 6,535,333 B1
(45) Date of Patent: Mar. 18, 2003

(54) OPTICAL SYSTEM WITH REDUCED COLOR SHIFT

(75) Inventors: Andrew J. Piepel, Hudson, WI (US); Robert S. Moshrefzadeh, Oakdale, MN (US); Gary T. Boyd, Woodbury, MN (US)

(73) Assignee: 3M Innovative Properties Company, Saint Paul, MN (US)

(*) Notice: Subject to any disclaimer, the term of this patent is extended or adjusted under 35 U.S.C. 154(b) by 20 days.

(21) Appl. No.: 09/717,598

(22) Filed: Nov. 21, 2000

(51) Int. Cl.[7] .................. G03B 21/60; G03B 21/56; G03B 27/28; G03B 21/14; G02F 1/1335
(52) U.S. Cl. .................. 359/453; 359/456; 359/460; 359/493; 359/502; 353/20; 353/84; 349/9
(58) Field of Search ............... 359/456, 453, 359/454, 455, 452, 460, 493, 502; 353/20, 84; 349/9

(56) References Cited

U.S. PATENT DOCUMENTS

| | | | |
|---|---|---|---|
| 2,378,252 A | 6/1945 | Staehle et al. ............. 88/28.93 |
| 3,383,153 A | 5/1968 | Vetter ..................... 350/126 |
| 3,552,822 A | 1/1971 | Altman .................... 350/126 |
| 3,712,707 A | 1/1973 | Henkes, Jr. ............... 350/122 |
| 3,832,032 A | 8/1974 | Shimada ................... 350/128 |
| 4,379,617 A | 4/1983 | Funakoshi et al. ......... 350/126 |
| 4,418,986 A | 12/1983 | Yata et al. ................ 350/128 |
| 4,468,092 A | 8/1984 | Inoue et al. .............. 350/128 |
| 4,509,823 A | 4/1985 | Moriguchi et al. ......... 350/128 |
| 4,576,850 A | 3/1986 | Martens ................... 428/156 |
| 4,763,985 A | 8/1988 | Bingham ................... 350/105 |
| 5,183,597 A | 2/1993 | Lu ......................... 264/1.4 |
| 5,241,416 A | 8/1993 | Mitsutaki et al. .......... 359/456 |
| 5,255,029 A * | 10/1993 | Vogeley et al. ............ 353/122 |
| 5,563,738 A | 10/1996 | Vance ...................... 359/614 |
| 5,706,065 A | 1/1998 | Yano ....................... 349/112 |
| 5,781,344 A | 7/1998 | Vance ...................... 359/614 |
| 5,815,313 A | 9/1998 | Mitani et al. .............. 359/448 |
| 5,917,646 A | 6/1999 | Sheridon ................... 359/296 |
| 5,932,342 A | 8/1999 | Zeira et al. ................ 428/327 |
| 5,959,704 A * | 9/1999 | Suzuki et al. ................ 349/9 |
| 6,163,402 A | 12/2000 | Chou et al. ................ 359/443 |
| 6,172,814 B1 | 1/2001 | Wantanabe et al. ......... 359/619 |
| 6,262,840 B1 * | 7/2001 | Watanabe et al. ........... 359/453 |
| 6,273,571 B1 * | 8/2001 | Sharp et al. ............... 353/122 |

FOREIGN PATENT DOCUMENTS

| | | |
|---|---|---|
| EP | 0 783 133 | 7/1997 |
| EP | 0 457 280 | 8/1999 |
| WO | 97/01610 | 1/1997 |
| WO | 98/45753 | 10/1998 |
| WO | 99/13378 | 3/1999 |
| WO | 99/50710 | 10/1999 |
| WO | 99/64927 | 12/1999 |

OTHER PUBLICATIONS

"Angles of View", vol. IV, 1. (3 pages) (1998).
U.S.S.N. 09/560,267, filed Apr. 26, 2000, Peipel et al., "Rear Projection Screen with Reduced Speckle".
U.S.S.N. 09/311,909, filed May 14, 1999, Morris et al., "Glass Microspheres for Use in Films and Projection Screen Displays and Methods".

* cited by examiner

*Primary Examiner*—Russell Adams
*Assistant Examiner*—Magda Cruz
(74) *Attorney, Agent, or Firm*—Stephen W. Buckingham

(57) ABSTRACT

An optical system with improved color shift characteristics is described. Preferably, the system comprises a rear projection display that includes a light source providing light in first and second distinct polarization states, and a beaded screen.

23 Claims, 5 Drawing Sheets

OPTICAL SYSTEM WITH REDUCED COLOR SHIFT

This invention relates generally to optical systems with reduced color shift performance and more particularly to transmissive screens for use in rear projection systems.

BACKGROUND

FIG. 1 illustrates a prior art rear projection system 10. Typical rear projection systems include an optical projection apparatus (e.g. projector) 12 and a screen 14.

There are many different technologies that may be utilized in the projector 12. Liquid crystal devices or LCD's are one example used in optical systems. Optical systems with LCD based projectors can supply bright (e.g. 1000–2500 Lumen), high resolution performance.

Rear projection screens transmit an image projected onto the rear of the screen into a viewing space. A rear projection screen 14 may be a sheetlike optical device with a relatively thin viewing layer that is placed at an image surface of the projector 12. Examples of rear projection displays are disclosed in PCT WO 99/064927, PCT WO 99/13378 and EP 783 133 (the entire contents of each of which are herein incorporated by reference).

A rear projection optical system typically includes a fresnel lens and/or a lenticular lens or sheet. Examples of such systems are disclosed in U.S. Pat. Nos. 3,712,707; 3,872,032; 4,379,617; 4,418,986; 4,468,092 and 4,509,823.

Front projection systems are also known in the art. They comprise a projector designed to project an image on a surface (the wall of a conference room or a screen). Overhead projectors are an example of a front projection system. Rear projection screens provide several advantages over front projection screens. Generally, it is easier to achieve desirable contrast features with a rear projection screen system. With a rear projection screen, the presenter cannot cast a shadow on the image and the projection equipment may be hidden from view (which also helps mask any acoustical background noise emanating from electrical components). Front projection systems have less capacity to absorb ambient light than rear projection systems.

One known rear projection screen comprises a thin, light diffusing layer (frosted or translucent glass) constructed by etching, sandblasting or otherwise roughening a smooth glass surface. Since the translucent surface scatters light, the image is viewable from a range of viewing angles. Screens that are merely translucent tend to strongly reflect ambient light incident on the front, viewing side, resulting in fading or washout of the projected image. As a result, this rear projection screen is sensitive to ambient lighting conditions.

U.S. Pat. No. 2,378,252 discloses a rear projection screen comprising an array of closely packed glass beads associated with a transparent support and a light absorbing layer. The glass beads perform lens-like functions to collect light projected from the rear of the screen and focus it to relatively small spots near the area where the beads contact the support. The glass beads contact the transparent substrate and thereby exclude most of the light absorbing material at the contact area location between the glass beads and support. Ambient light incident on the front surface of the support is absorbed by the light absorbing layer. As a result, the front side of the screen appears dark, except for the light transmitted through the glass beads.

Rear projection screens with glass beads are also disclosed in U.S. Pat. Nos. 5,563,738 and 5,781,344. Additional beaded screens and methods of making such screens are disclosed in commonly assigned patent applications PCT WO 99/50710 and PCT WO 98/45753.

SUMMARY

The present invention is particularly suitable for use in an optical system that includes a projected image source and a screen. The screen has a plurality (e.g. an array) of refractive elements (e.g. glass beads), an optional light transmitting substrate, an optional light absorbing layer for controlling ambient light rejection; and a polarized light management layer for controlling the color shift of the optical system.

The illumination source provides light having a first polarization state associated with a first color and a second polarization state associated with a second color. The first polarization state is distinct from the second polarization state. For example, the first color may be completely linearly polarized in the horizontal plane, and the second color may be completely linearly polarized in the vertical plane. As used herein in the context of linearly polarized light, when it is said that a first color has a polarization state that is different than or distinct from the polarization state of a second color, it is meant that, with respect to the same plane of incidence, the relative amounts of p-polarized and s-polarized light in the first color are significantly different than the amounts of p-polarized and s-polarized light in the second color (i.e. more than ten percent). Preferably, at least: one of the first and second colors is a primary color.

The present invention also contemplates light that is polarized in a state other than linearly polarized light. For example, the first color may be elliptically polarized light with a major axis of electromagnetic vibration; and the second color may also be eliptically polarized light with a major axis of electromagnetic vibration. The major axes of the first and second colors may be offset. The present invention has particular advantages when such axes are orthogonal or perpendicular to each other.

LCD projectors are capable of providing an optical system with significant brightness (e.g., a brightness of at least 1000 Lumens ANSI). While bright, the light provided by a liquid crystal device (LCD) projector is linearly polarized. It was recognized that some LCD based projectors present the green, red and blue components of light in two distinct states of polarization. The polarization state of the green light was perpendicular to the polarization state of the red and blue light. For example, green was present in the horizontal state. Red and blue combined (purple) was present in the vertical state. It was recognized that, when such an LCD projector was used with a conventional glass-beaded, rear projection screen, a varying color shift or color shift gradient was visible to the viewer when the screen was viewed off-axis in either the horizontal or vertical direction.

In one embodiment of the present invention, the polarized light management layer may comprise a color compensation coating. The color compensation coating reduces the color shift viewable by a user of the optical system. Preferably, the color compensation coating is a ¼ wave coating. Alternatively, the color compensation coating may have a non-uniform thickness. Also alternatively, the color compensation coating may have a portion whose thickness is less than a ¼ wave thickness.

In another embodiment of the present invention, the polarized light management layer comprises a color compensating, diffuse coating. The coating preferably comprises a polymer with particles (e.g. beads) embedded therein. The refractive index difference between that of the polymer and that of the beads is preferably small.

A Color Shift Test is disclosed herein to evaluate the color shift of an optical system that utilizes preferred embodiments of the present invention. Preferably, an optical system with a glass beaded screen according to the present invention exhibits an off-axis color shift of about 0.010 or less at off-axis angles of sixty (60) or more degrees when measured according to the Color Shift Test. Also preferably, the optical system exhibits an off-axis color shift of less than about 0.005 or less at off-axis angles of forty-five (45) or more degrees when measured according to the Color Shift Test. Surprisingly, a 45–70% reduction (depending on the off-axis viewing angle) of color shift was visible to the viewer when a glass beaded rear projection screen incorporating the present invention was used in conjunction with an LCD based projector that presented the green, red and blue components of light in two distinct states of polarization.

In another aspect, the invention comprises a rear projection screen for use with an optical system as described above.

BRIEF DESCRIPTION OF THE DRAWINGS

The invention may be more completely understood in the following detailed description of various embodiment of the invention in connection with the accompanying drawings, in which.

Figure 1:
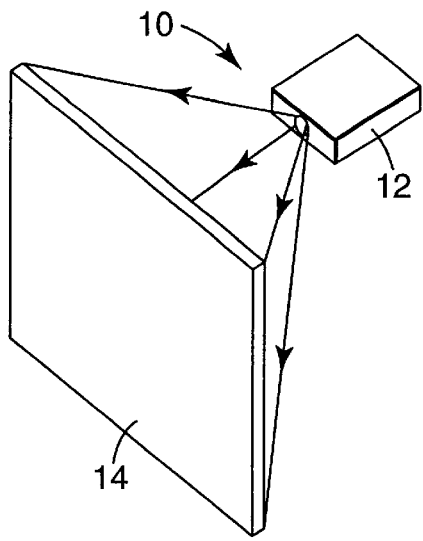
FIG. 1 is a schematic of a prior art optical system.

The invention is amenable to various modifications and alternative forms. Specifics of the invention are shown in the drawings by way of example only. The intention is not to limit the invention to the particular embodiments described. Instead, the intention is to cover all modifications, equivalents, and alternatives falling within the spirit and scope of the invention as defined in the claims.

DETAILED DESCRIPTION

Figure 2:
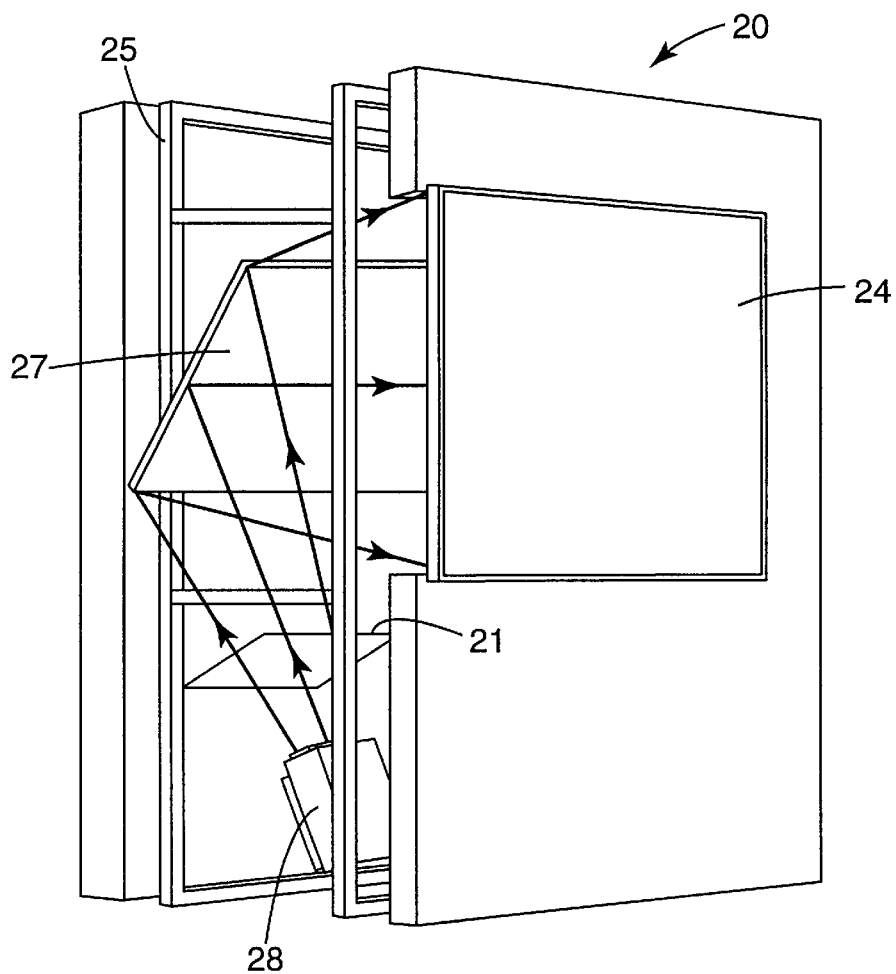
FIG. 2 is a schematic of a rear projection system according to one aspect of the present invention.

Referring to FIG. 2, the present invention is particularly suitable for use in an optical system that includes an illumination source 28, frame 25, polarized light management element 21, optional mirror 27 and a screen 24. While the illustrated optical system 20 includes a mirror 27, it is noted that the optical system according to the present invention need not include a mirror (such as the illumination source shown in FIG. 7 and discussed in greater detail below). The optical system may comprise many different types of products, such as, but not limited to, televisions, video walls, large screen TV's,. and data monitors.

The illumination source 28 projects an image toward screen 24. The screen 24 has a rear side that receives light originating from illumination source 28 and a front side or viewing side. In use, the viewer looks at the front side of the screen 24 to see the image provided by the optical system 20. In a preferred embodiment, the screen 24 comprises a rear projection screen such as a beaded screen. It should be noted that other screens are also contemplated for use with the present invention including those that use significant refraction to achieve a desired viewing angle. For example, the optical system 20 may include a fresnel lens and/or a lenticular lens or sheet as described in or constructed in accordance with U.S. Pat. Nos. 3,712,707; 3,872,032; 4,379,617; 4,418,986; 4,468,092; 4,509,823; 4,576,850 and 5,183,597 (the entire contents of which are herein incorporated by reference).

The illumination source 28 may present the green, red and blue components of light in two or more distinct states of polarization. For example, the illumination source 28 may provide light having a first linear polarization state associated with at least one (e.g., a first) color and a second linear polarization state associated with at least one (e.g., a second) color. The present invention is particularly useful when, for the same plane of incidence, the relative amounts of p-polarized and s-polarized light in the first color are significantly different than the amounts of p-polarized and s-polarized light in the second color (i.e. more than ten percent). For example, purely p-polarized green light would have completely different p-polarized (100%) and s-polarized (0%) components than purely s-polarized purple (red and blue) light (0% p-polarized light, 100% s-polarized light). The present invention is particularly suitable for use in a system where the axes of principal electromagnetic vibration for the first and second states of polarization are orthogonal or perpendicular to each other. Preferably, at least one of the first and second colors is an additive primary color (i.e., blue, red or green).

The present invention is suitable for use with various illumination sources but it is particularly suitable for use with an illumination source that provides light having a first polarization state associated with a first color and a second polarization state associated with a second color that is distinct from the polarization state of the first color.

A polarized light management element 21 is shown in FIG. 2 to be between the mirror 27 and the illumination source 28, but the polarized light management element of the present invention may be provided anywhere in the optical system 20. For example, the polarized light management element may be provided on the illumination source 28, the mirror 27, screen 24, combinations thereof, etc. Generally, the polarized light management element 21 results in a reduced color shift for the optical system 20, particularly at increasing off axis viewing angles. The polarized light management element 21 shown in FIG. 2 may comprise a color rotator or a ½ wave plate. The color rotator rotates the first color to render the first and second colors substantially parallel.

Figure 5:
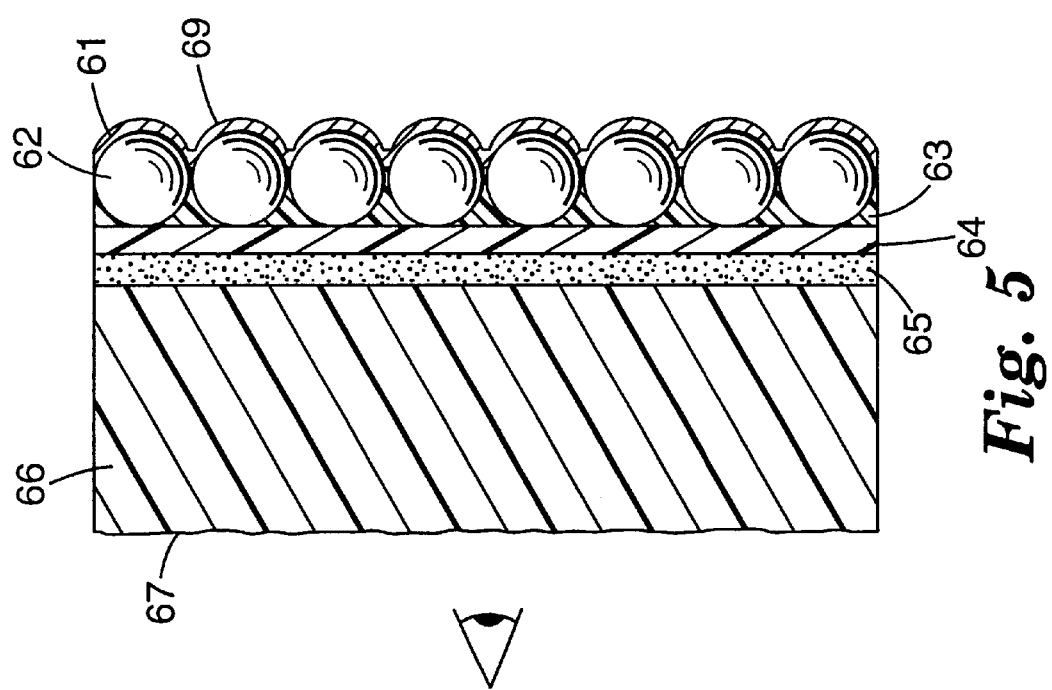
FIG. 5 illustrates a rear projection screen having a polarized light management layer in the form of a quarter wave coating for controlling the color shift of the optical system according to an embodiment of the present invention.

Referring to FIG. 5, there is shown another embodiment of the present invention that includes the polarized light management element on a screen 60. In this embodiment, the polarized light management element (discussed below) alters the association of a particular color with a particular linear polarization state. The screen 60 has a front side or viewing side 67 closest to a viewer, and a back side 69 opposite the viewing side 67. Optionally, the viewing side 67 may have a matte finish.

The screen 60 has a plurality of refractive elements 62 (e.g., glass beads), a light transmitting substrate 66, and a light absorbing layer 63. In this embodiment of the present invention, the polarized light management element comprises a polarized light management layer 61 for controlling the color shift perceived by a viewer of the optical system 20. Placing the polarized light management layer 61 on the screen alone obviates the need to place it on other elements of the optical system.

The plurality of refractive elements 62 are preferably situated in substantially predetermined positions with the understanding that manufacturing and cost limitations may limit the precision of the placement. For example, the refractive elements 62 may be placed in an array, a closely or loosely packed arrangement.

The light absorbing layer 63 may be coated on or associated with the light transmitting substrate 62. The light absorbing layer 63 helps controls ambient light rejection for the optical system of the present invention.

The light absorbing layer 63 may be opaque or substantially opaque. The absorbing layer 63 preferably comprises one or more of a powder coating of carbon black, a black dye, an opaque particle, an organic or inorganic pigment or particle, or such a particle dispersed in a binder material. They may be of a wide variety and shapes. The material may be dispersed in a liquid or solid binder system. In one embodiment, the absorbing layer 63 comprises a clear binder having black particles dispersed therethrough. The binder may comprise, for example, an acrylate or other UV curable polymer. The absorbing layer 63 may be applied by a conventional technique such as a coating process or powder coating.

The refractive elements 62 may be constructed from glass or polymeric materials. Suitable examples include glass or a transparent plastic material. The beads may comprise those disclosed in commonly assigned patent applications PCT WO 99/50710 and PCT WO 98/45753 (the entire contents of each of which are herein incorporated by reference).

The substrate 66 is preferably transparent or translucent. Suitable transparent substrates include flexible and rigid substrates such as acrylic. The substrate 66 may have an optional matte anti-glare finish at the exit, preferably achieved by embossing. It should be noted that the substrate 66 is optional or it could be removed (e.g. if the refractive elements 62 and layer 63 are self-supporting.

Layer 64 is also optional. It may comprise a clear binder layer for providing structural integrity.

Figure 3:
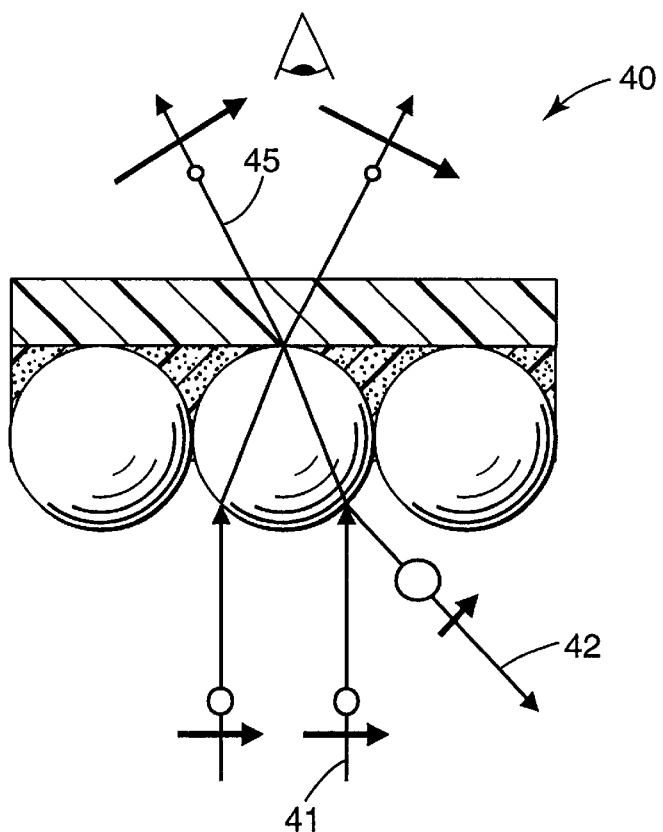
FIG. 3 is a schematic representation of the polarization state intensity in the horizontal plane of polarized light associated with a beaded screen.

Referring now to FIG. 3, it was recognized that some LCD based projectors present the green, red and blue components of light in two distinct states of polarization. It was noted that green was present in the horizontal state and red and blue combined (purple) in the vertical state. It was recognized that, when such an LCD projector was used with a conventional glass-beaded, rear projection screen, a color shift was visible to the viewer when the screen was viewed off-axis in either the horizontal or vertical direction. The color shift is a result in the differences in transmission of these polarization states through the beaded screen. Different states of polarization are preferentially transmitted or reflected depending on angle. Because color is linked to polarization state, a viewable color shift results.

FIG. 3 schematically illustrates polarization state intensity in the horizontal plane 40. Light rays 41 that are incident on the backside of the screen have components that are linearly polarized horizontally and components that are linearly polarized vertically. In light ray 41, the horizontally polarized light is identified as a circle on light ray 41 while vertically polarized light is identified as: an arrow crossing light ray 41. The relative sizes of the circle and arrows are not to scale and are exaggerated for illustrative purposes.

The incident light 41 may be reflected such as light ray 42 or may ultimately exit the screen such as light ray 45. Horizontally polarized light (here the p-polarized state) output is higher than vertically polarized light (here the s-polarized state), owing to the higher reflectivity of s-polarized light at high angles of incidence. The higher output of the horizontally polarized light is illustrated by the large arrow on exiting light 45. As a result, colors which are vertically polarized (e.g. blue and red) will be relatively dimmer than horizontally polarized (green) colors when viewed at increasing off-axis horizontal angles.

Figure 4:
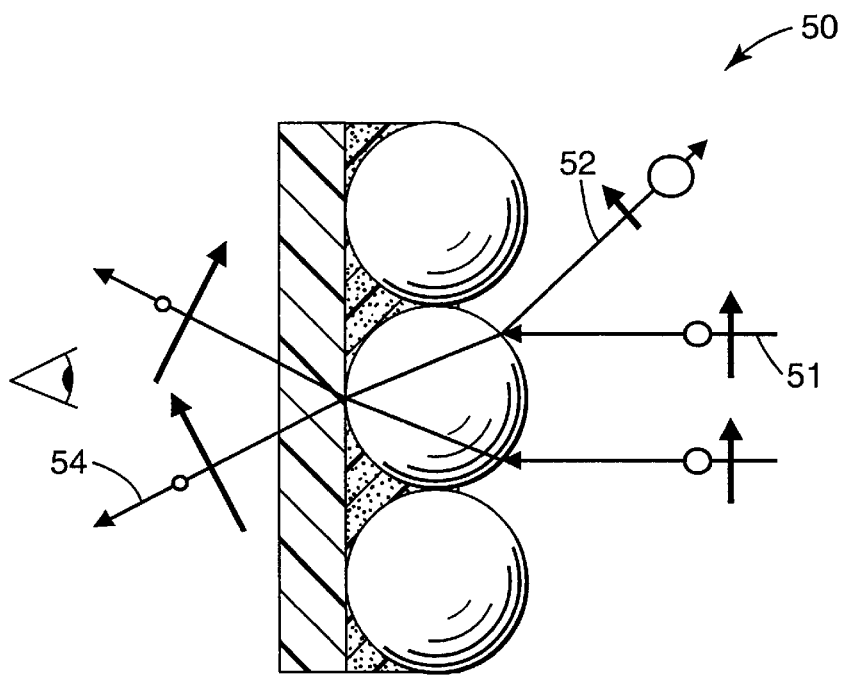
FIG. 4 is a schematic representation of the polarization state intensity in the vertical plane of polarized light associated with a beaded screen.

FIG. 4 illustrates that the opposite applies in the vertical plane. FIG. 4 illustrates polarization state intensity in the vertical plane 50. Light rays 51 incident on the backside of the screen have horizontally and vertically polarized components. In light ray 51, the horizontally polarized light is identified as a circle on light ray 51 while vertically polarized light is identified as an arrow crossing light ray 51. The incident light 51 may be reflected such as light ray 52 or may ultimately exit the screen such as light ray 54. Vertically polarized light (here the p-polarized state) output is higher than horizontally polarized light output (there the s-polarization state), owing to the higher reflectivity of the s-polarized light at high angles of incidence. The higher output of the vertically polarized light is illustrated by the large arrow on the exiting light 54. As a result, colors which are vertically polarized (e.g., blue and red) will be relatively brighter than horizontally polarized (green) colors when viewed at increasing off-axis vertical angles.

Referring now to FIG. 5, the polarized light management layer 61 may comprise a color compensation coating. For example, the color compensation coating may be an anti-reflection coating selected to reduce the color shift of the optical system. The characteristics of the color compensation coating (e.g. size, location and shape) are selected to substantially reduce the difference in the relative transmission intensities of the first and second colors at off-axis viewing angles. Preferably, the color compensation coating is selected to optimize the transmission of the color responsible for undesired color shift. Optionally, the color compensation may be tuned for a particular wavelength of light and a particular viewing angle. More preferably, the color compensation coating may be a ¼-wave coating. A ¼-wave color compensation coating on the glass bead surface 62 increases relative transmission for the wavelength(s) responsible for the undesirable color shift (the intensity deficient wavelength) at off-axis viewing angles. The ¼-wave coating thereby results in increased color uniformity at desired predetermined off axis viewing angles.

The refracting elements 62 are preferably transparent, spherical, refracting beads seated in an absorptive, high optical density transparent polymer matrix. The beads are preferably in intimate contact with the transparent binder material.

Alternatively, the polarized light management element may comprise a roughened or matte finish on the glass beads. This texture may be provided by roughening the beads by sandblasting or by providing a mild acidic bath (e.g. hydrofluoric acid). This embodiment obviates the need to apply an additional material to the screen.

Polarized light management layer 61 may comprise a ¼ wave cryolite (Na$_3$AlF$_6$) coating applied by vapor coating the glass bead surface. Other suitable color compensation coatings are believed to include, but are not limited to Magnesium Fluoride (MgF$_2$) or a multilayer of MgF$_2$/ZnS.

Layer 65 is an optional optical adhesive, preferably applied by lamination. Optical adhesives 65 that are believed to be suitable are disclosed in PCT WO 97/01610 (the entire contents of which are herein incorporated by reference). Adhesive layer 65 may be completely omitted, if, for example, either the binder 64 or the light absorbing layer 63 adhere the beads 62 to the substrate 66.

Alternatively, the color compensation coating may have a non-uniform thickness (not shown). Also alternatively, the color compensation coating may have a portion whose thickness is less than a ¼ wave thickness.

Figure 6:
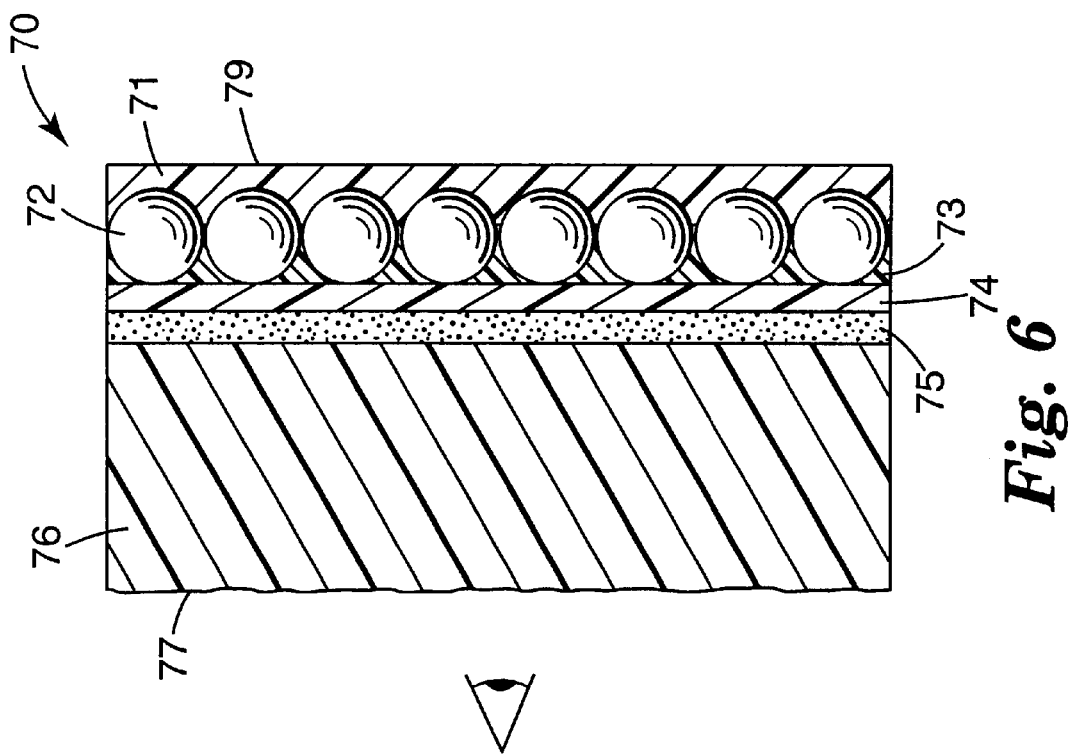
FIG. 6 illustrates a rear projection screen having a polarized light management layer in the form of a diffuse coating for controlling the color shift of the optical system according to another embodiment of the present invention.

FIG. 6 shows another embodiment of screen 70 according to one aspect of the present invention. The screen 70 has a front side or viewing side 77 closest to a viewer, and a back side 79 opposite the viewing side 77. Optionally, the viewing side 77 may have a matte finish.

The screen 70 has an array of refractive elements 72 (e.g., glass beads), a light transmitting substrate 76, a light absorbing layer 73; and a polarized light management layer 71 for controlling the color shift of the optical system.

The light absorbing layer 73 is associated with the light transmitting substrate 76 and helps control ambient light rejection of the screen 70. The polarized light management layer 71 comprises a coating for at least partially altering the polarization state of at least one color. The coating 71 serves to at least partially depolarize the incoming light incident on back side 79. The disassociation of polarization state and color results in a reduction of the color shift of the screen. Optionally, a cryolite coating (e.g., 61 in FIG. 5) may also be added to the coating 71.

The transparent, spherical, refracting beads 72 are preferably seated in an absorptive, high optical density polymer matrix and are in intimate contact with the transparent binder material. Layer 75 represents an optional optical adhesive, preferably applied by lamination. Layer 76 is a substrate (e.g., a rigid acrylic) with an optional matte anti-glare finish at the exit achieved by embossing. The coating 71 may be a 0.013 mm coating over the glass bead surface consisting of 15 wt % polystyrene beads (0.005 mm)(n$_{PS}$= 1.55) dispersed in polyvinyl butyral (PVB) (n$_{PVB}$=1.49).

Layer 74 is optional. It may comprise a clear binder layer for providing structural integrity.

Suitable coatings 71 may comprise a host or matrix with particles therein. Preferably, the index of refraction of the particles is close to the index of refraction of the matrix (i.e. $\Delta n = n_{particles} - n_{matrix}$~small) so that a maximum of interactions are achieved with a minimum of scattering which may reduce the brightness of the screen. Preferably, the difference in the indexes of refraction is less than 0.10, more preferably 0.06 or less. Alternatively, other factors may be varied to achieve the desired effect. For example, the number of particles in the matrix may be altered (e.g., increased) to achieve the desired effect.

The present invention is particularly suitable for use in optical systems wherein viewers may be positioned at large off-axis viewing angles. Preferably, optical system of the present invention may be viewed at off-axis viewing angles of more than about ten (10) degrees. More preferably, the optical system of the present invention may be viewed at off-axis viewing angles of more than about twenty (20) degrees. Even more preferably, the optical system of the present invention may be viewed at off-axis viewing angles of more than about thirty (30) degrees.

Color Shift Test

Figure 7:
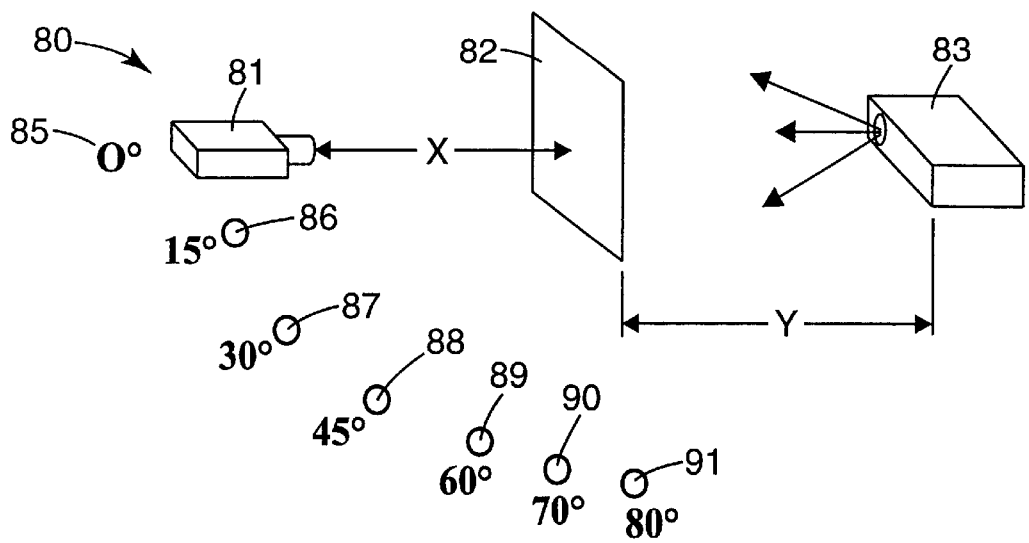
FIG. 7 is a schematic depiction of a test apparatus used to measure color shift.
Figure 9:
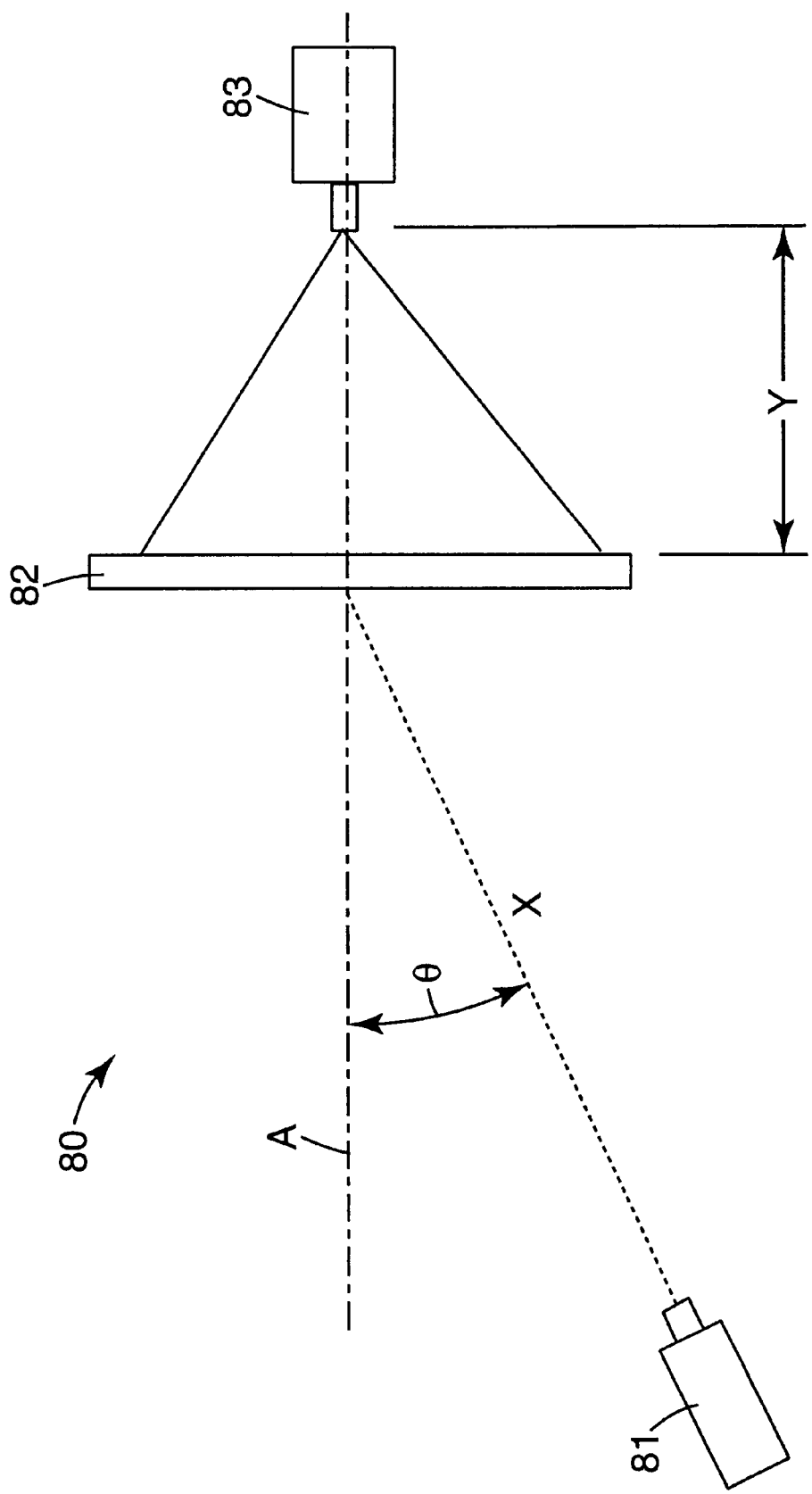
FIG. 9 is another schematic depiction of the test apparatus of FIG. 7 used to measure color shift.

A Color Shift Test is disclosed herein to evaluate the color shift of an optical system that utilizes preferred embodiments of the present invention. FIGS. 7 and 9 illustrate a test apparatus used to conduct the Color Shift Test according to an aspect of the present invention. The test apparatus consisted of a Photo Research PR650 SpectraColorimeter 81 and a Toshiba TLP-710 LCD projector 83 rated at 1400 lumens, which utilizes an LCD imater with the LCDs operating in the cross polarized mode. Several screens 82 were tested. The screens 82 were placed a distance Y (about 36 inches or 91.3 centimeters) from the projection lens of the projector 83 and a distance or radius X (about 32 inches or 81.2 centimeters) to the input aperture of the calorimeter 81.

The angle θ of the PR 650 was achieved using a Parker 360 degree turntable.

The colorimeter was used to measure the color of an image projected onto rear projection test screen 82 by projector 83. During the tests for color shift, projector 83 projected a plain white image on screen 82. Colorimeter 81 was set to view a 2° cone of light emanating from a particular area (the intersection of the axis A and radius X in FIG. 9) on screen 82. Colorimeter 81 was placed at various angles θ and the color coordinates were measured, using the 1976 CIE uniform chromaticity coordinates u' and v'. The color coordinates v'$_0$, v'$_0$, measured at θ=0, were taken to be the baseline, color, so that differences in v', v' from these baseline values could then be taken as the color shift, denoted hereinafter by S. Color shift S was calculated as follows:

$$S=\{|u'-u'_0|^2-|v'-v'_0|^2\}^{1/2}$$

Figure 8:
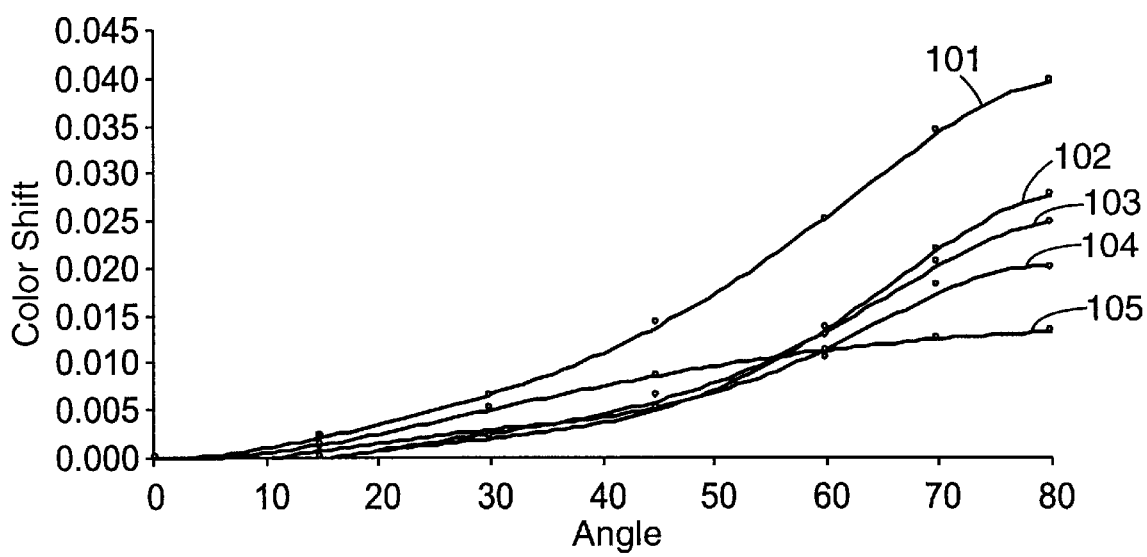
FIG. 8 is a graph of color shift versus angle for several screens tested with the test apparatus depicted in FIG. 7.

The results of these tests are shown in Table 1 and in FIG. 8. A color shift of about 0.010 is detectable by the human eye.

The test apparatus was assembled to measure the color shift of several rear projection screens 82 at 0° (reference character 85), 15° (reference character 86), 30° (reference character 87), 45° (reference character 88), 60° (reference character 89), 70° (reference character 90) and 80° (reference character 91) angles. The screens 82 measured were as follows:

1. A prior art beaded rear projection screen (3M's XRVS 120 screen).
2. An embodiment of the present invention comprising a beaded rear projection screen with a ¼ wave cryolite (Na$_3$AlF$_6$) coating applied to the beaded surface.
3. An embodiment of the present invention comprising a beaded rear projection screen with a 0.013 mm coating of 15 wt % polystyrene beads (0.005 mm) dispersed in polyvinyl butyral on the refractive elements surface.
4. A prior art beaded rear projection screen with a 0.025 mm coating of polyvinyl butyral on the beaded surface.
5. A prior art diffusion rear projection screen (3M's XRGS-NP screen) consisting of a 0.40 mm UV curable acrylate laminated to a rigid acrylic substrate. This sample was included as an example of a screen exhibiting a low color shift when used with a cross polarized projector.

Results from the Color Shift Test are disclosed in Table 1.

TABLE 1

| | Color Shift | | | | |
|---|---|---|---|---|---|
| Angle | Glass Beaded Screen | ¼ Wave Cryolite Coating | 15 wt % Poly. Sty. Beads in PVB Coating | Polyvinyl Butyral Coating | Screen |
| 0  | 0.000 | 0.000 | 0.000 | 0.000 | 0.000 |
| 15 | 0.002 | 0.000 | 0.001 | 0.000 | 0.001 |
| 30 | 0.006 | 0.002 | 0.002 | 0.002 | 0.005 |
| 45 | 0.014 | 0.005 | 0.006 | 0.006 | 0.009 |
| 60 | 0.025 | 0.013 | 0.010 | 0.013 | 0.011 |
| 70 | 0.034 | 0.022 | 0.018 | 0.021 | 0.013 |
| 80 | 0.040 | 0.028 | 0.020 | 0.025 | 0.013 |

The results of Table 1 are graphed in FIG. 8. Curve 101 corresponds to screen #1. Curve 102 corresponds to screen #2. Curve 103 corresponds to screen #4. Curve 104 corresponds to screen #3. Curve 105 corresponds to screen #5.

Preferably, an optical system with a glass beaded screen according to the present invention exhibits an off-axis color shift of about 0.010 or less at off-axis angles of sixty (60) or more degrees when measured according to the Color Shift Test. Also preferably, the optical system exhibits an off-axis color shift of about 0.005 or less at off-axis angles of forty-five (45) or more degrees when measured according to the Color Shift Test.

As can be seen in both Table 1 and FIGS. 7 and 8, for viewing angles of 60° or less off-axis (a 120° viewing cone) the ¼ wave cryolite coated screen demonstrates a reduction of color shift ranging from 70% (0°–45°) to 45% (~60°) over a conventional glass beaded screen. The ¼ wave cryolite coated screen also performs as well or better than the conventional diffusion screen over this range of angles. At angles greater than 60° the efficiency of the ¼ wave cryolite coating drops off, which is consistent with color compensation coatings of this type. However most rear projection screens are rarely viewed at angles greater than 60° off-axis.

The beaded rear projection screen coated with a 0.013 mm layer of 15 wt % polystyrene beads (0.005 mm) dispersed in polyvinyl butyral reduces the color shift similarly to the cryolite coated screen for viewing angles of 60° or less off-axis. However at angles greater than 60° this coating demonstrates a 20% improvement over either the polyvinyl butyral or cryolite coated screens. This coating could be combined with an optimal matte anti-glare finish to minimize speckle (or scintillation). As used herein, speckle (or scintillation), a random intensity distribution, is formed when partially coherent light encounters a diffusing surface such as a matte surface. The resulting interference pattern, caused by the scattering off of the diffuse surface results in speckle. Speckle significantly reduces the resolution of the screen by masking the high spatial frequency information content and resulting in a grainy appearance that is highly undesirable.

In the above description, the position of elements has sometimes been described in terms of "upper", "lower", "over", "under", "vertical", "horizontal", "top" and "bottom". These terms have been used merely to simplify the description of the various elements of the invention, such as those illustrated in the drawings. They should not be understood to place any limitations on the useful orientation of the elements of the present invention.

Accordingly, the present invention should not be considered limited to the particular examples described above, but rather should be understood to cover all aspects of the invention as fairly set out in the claims. Various modifications, equivalents, as well as numerous structures to which the present invention may be applicable will be readily apparent to those of skill in the art to which the present invention is directed upon review of the present specification. The claims are intended to cover such modifications and devices.

What is claimed is:

1. An optical system comprising:
   an illumination source for providing light having a first polarization state associated with a first color and a second polarization state associated with a second color; the first polarization state being distinct from the second polarization state,
   a screen comprising:
      a plurality of refractive elements arranged to provide the optical system with predetermined optical properties,
      a light transmitting substrate,
      a light absorbing layer associated with the light transmitting substrate for controlling ambient light rejection;
   the illumination source and screen defining an optical path for the optical system; and
   a polarized light management element, disposed in the optical path, for reducing the color shift of the optical system wherein the screen has a rear side and a viewing side and the polarized light management element comprises a color compensation coating on the rear side of the screen.

2. An optical system according to claim 1 wherein the first color is linearly polarized light and the second color is linearly polarized light.

3. An optical system according to claim 1 wherein the first color is green and the second color is a combination of red and blue (e.g. purple).

4. An optical system according to claim 1 wherein at least one of the first and second colors is a primary color.

5. An optical system according to claim 1 wherein the color compensation coating is a ¼ wave coating.

6. An optical system according to claim 1 wherein the color compensation coating has a non-uniform thickness.

7. An optical system according to claim 1 wherein the color compensation coating has a portion whose thickness is less than a ¼ wave thickness.

8. An optical system according to claim 1 wherein the illumination source provides light in:
   a first linear polarization state associated with a first color;
   a second linear polarization state associated with a second color; and
   a third linear polarization state associated with a third color, wherein the first, second and third colors are different than each other and offset from each other.

9. A rear projection screen for use in an optical system having off-axis viewing angles and utilizing an illumination source that provides light having a first polarization state associated with a first color and a second polarization state associated with a second color; the first polarization state being distinct from the second polarization state, the first and second colors having transmission intensities at off-axis viewing angles, the rear projection screen comprising:
   a plurality of refractive elements; and
   a polarized light management layer sized and shaped to reduce any difference in the relative transmission intensities of the first and second colors at off-axis viewing angles to reduce the color shift of the optical system wherein the screen includes glass beads, and the screen exhibits an off-axis color shift of less than about 0.010 at off-axis viewing angles of sixty (60) or more degrees when measured according to the Color Shift Test.

10. A rear projection screen according to claim 9 wherein the polarized light management layer comprises a color compensation coating that reduces the color shift of the optical system due to light being provided with a first polarization state associated with a first color and a second polarization state associated with a second color that is distinct from the first polarization state.

11. A rear projection screen according to claim 10 wherein the color compensation coating is a ¼ wave coating.

12. A rear projection screen according to claim 10 wherein the color compensation coating has a non-uniform thickness.

13. A rear projection screen according to claim 10 wherein the color compensation coating has a portion whose thickness is less than a ¼ wave thickness.

14. A rear projection screen according to claim 9 wherein the screen includes glass beads, and the screen exhibits an off-axis color shift of less than about 0.010 at off-axis viewing angles of sixty (60) or more degrees when measured according to the Color Shift Test.

15. A rear projection screen according to claim 9 wherein the screen exhibits an off-axis color shift of less than about 0.005 at off-axis viewing angles of forty-five (45) or more degrees when measured according to the Color Shift Test.

16. A rear projection screen according to claim 9 wherein the polarized light management layer comprises a coating for at least partially altering the polarization state of at least one color.

17. A rear projection screen according to claim 16, further including a ¼ wave coating.

18. A rear projection screen according to claim 9, wherein the plurality of refractive elements comprises glass beads and the polarized light management layer receives light prior to the glass beads.

19. A rear projection screen according to claim 9, wherein the polarized light management layer comprises more than one layer.

20. A rear projection screen according to claim 9, wherein the screen includes a light absorbing layer associated with the light transmmitting substrate for controlling ambient light rejection and a light transmitting substrate.

21. An optical system comprising:
   an illumination source for providing light having a first polarization state associated with a first color and a second polarization state associated with a second color; the first polarization state being distinct from the second polarization state,
   a screen comprising:
      a plurality of refractive elements arranged to provide the optical system with predetermined optical properties,
      a light transmitting substrate,
      a light absorbing layer associated with the light transmitting substrate for controlling ambient light rejection wherein the screen is a beaded screen that exhibits an off-axis color shift of about 0.010 or less at off-axis viewing angles of sixty (60) or more degrees when measured according to the Color Shift Test;
   the illumination source and screen defining an optical path for the optical system; and
   a polarized light management element, disposed in the optical path, for reducing the color shift of the optical system.

22. An optical system comprising:
   an illumination source for providing light having a first polarization state associated with a first color and a second polarization state associated with a second color; the first polarization state being distinct from the second polarization state,
   a screen comprising:
      a plurality of refractive elements arranged to provide the optical system with predetermined optical properties,
      a light transmitting substrate,
      a light absorbing layer associated with the light transmitting substrate for controlling ambient light rejection;
   the illumination source and screen defining an optical path for the optical system; and
   a polarized light management element, disposed in the optical path, for reducing the color shift of the optical system
   wherein the optical system exhibits an off-axis color shift of about 0.005 or less at off-axis viewing angles of forty-five (45) or more degrees when measured according to the Color Shift Test.

23. A rear projection screen for use in an optical system having off-axis viewing angles and utilizing an illumination source that provides light having a first polarization state associated with a first color and a second polarization state associated with a second color; the first polarization state being distinct from the second polarization state, the first and second colors having transmission intensities at off-axis viewing angles, the rear projection screen comprising:
   a plurality of refractive elements; and
   a polarized light management layer sized and shaped to reduce any difference in the relative transmission intensities of the first and second colors at off-axis viewing angles to reduce the color shift of the optical system wherein the optical system exhibits an off-axis color shift about 0.005 or less at off-axis viewing angles of forty-five (45) or more degrees when measured according to the Color Shift Test.

* * * * *